Patented June 16, 1942

2,286,363

UNITED STATES PATENT OFFICE 2,286,363

α-1-NAPHTHYL CINNAMIC NITRILE

Ingenuin Hechenbleikner, Stamford, Conn., assignor to American Cyanamid Company, New York, N. Y., a corporation of Maine No Drawing. Application June 6, 1941,
Serial No. 396,872

1 Claim. (Cl. 260—465)

The present invention relates to α-1-naphthyl cinnamic nitrile, a new compound which is of particular interest as an intermediate in the preparation of the corresponding amine, amide and acid, as a plasticizer for synthetic resins, and as an insecticidal agent. It is highly effective in controlling soft-bodied and sucking insects which are particularly difficult to exterminate, for example the citrus red spider, *Tetranychus citri*, and the bean aphid, *Aphis rumicis*.

The following example, in which the parts are by weight, illustrates a specific method of preparing the above compound in accordance with the invention.

Example

To a mixture consisting of 100 parts of 1-naphthyl acetonitrile and 64 parts of benzaldehyde there are added 20 parts of a 5% solution of sodium hydroxide in ethyl alcohol. After standing at room temperature (20° C.) for 24 hours, the reaction product is dissolved in ether, washed neutral (0.05% sulfuric acid), dried over sodium sulfate and distilled at reduced pressure. The α-1-naphthyl cinnamic nitrile is recovered as a viscous yellow oil boiling at 240° C. at less than 1 mm. pressure.

Although this new compound is especially effective as a contact poison for the control of insect pests, it may also be used for fungicidal and bactericidal purposes.

While the invention has been described with particular reference to specific embodiments, it is to be understood that it is not to be limited thereto, but is to be construed broadly and restricted solely by the scope of the appended claim.

I claim:

α-1-naphthyl cinnamic nitrile.

INGENUIN HECHENBLEIKNER.